US006428222B1

(12) United States Patent

Dunham

(10) Patent No.: US 6,428,222 B1
(45) Date of Patent: Aug. 6, 2002

(54) SENSOR FOR IDENTIFYING MARKS ON A RIBBON

(75) Inventor: Matthew K. Dunham, Eagan, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 09/710,492

(22) Filed: Nov. 10, 2000

Related U.S. Application Data

(60) Provisional application No. 60/165,128, filed on Nov. 12, 1999.

(51) Int. Cl.[7] .......................... B41J 33/32; B41J 29/18; B23Q 15/00

(52) U.S. Cl. ......................... 400/247; 400/708; 226/24; 226/45

(58) Field of Search .......................... 347/214; 400/582, 400/208, 711, 708; 346/151; 226/45, 24

(56) References Cited

U.S. PATENT DOCUMENTS

| | | | | |
|---|---|---|---|---|
| 4,573,059 A | | 2/1986 | Shinna et al. | 346/76 |
| 4,588,316 A | | 5/1986 | Everett, Jr. | 400/248 |
| 4,710,781 A | | 12/1987 | Stephenson | 346/76 |
| 4,910,533 A | * | 3/1990 | Sasaki et al. | 346/151 |
| 5,266,967 A | | 11/1993 | Maslanka et al. | 346/76 |
| 5,393,149 A | * | 2/1995 | Iima | 400/208 |
| 5,515,452 A | | 5/1996 | Penkethman et al. | 382/141 |
| 5,823,692 A | * | 10/1998 | Tolrud et al. | 400/582 |
| 5,949,467 A | * | 9/1999 | Gunther et al. | 347/214 |
| 6,176,630 B1 | * | 1/2001 | Miller et al. | 400/711 |

FOREIGN PATENT DOCUMENTS

| | | |
|---|---|---|
| EP | 0 561 347 | 9/1993 |
| JP | 01174483 A | 12/1987 |

* cited by examiner

*Primary Examiner*—Andrew H. Hirshfeld
*Assistant Examiner*—Marvin P Crenshaw
(74) *Attorney, Agent, or Firm*—Westman, Champlin & Kelly

(57) ABSTRACT

A reflective type light sensitive sensor assembly is used for sensing the position of marks on a surface moving past the sensor. A typical showing is in relation to sensing marks on a ribbon used during printing operations, or lamination operations. The sensor assembly includes a LED light source that has a central axis, and a light sensitive transistor or sensor mounted in a single housing, with the housing oriented so that the axis of the light from the LED is inclined at an acute angle relative to the surface of the ribbon. The axis is at an angle other than perpendicular or near perpendicular to the surface. The marks used for identification are light diffusing marks, such as white marks or strips that will provide adequate reflection of light back to the light sensitive transistor or sensor forming part of the sensor assembly.

11 Claims, 4 Drawing Sheets

SENSOR FOR IDENTIFYING MARKS ON A RIBBON

CROSS REFERENCE TO RELATED APPLICATION

This application claims benefit of priority of U.S. Provisional Application Ser. No. 60/165,128, filed Nov. 12, 1999.

BACKGROUND OF THE INVENTION

The present invention relates to the use of an optical sensor for identifying marks on a printer print ribbon, or transfer ribbon. The sensor provides a reliable and accurate signal indicating that particular marks on the ribbon have been sensed using low cost light sources and optical sensors.

In the prior art, various ribbons have been advanced that have marks for identification of separations between individual blocks or segments of different colors, and also for identifying positions of a ribbon that is being used in a printing operation or a lamination operation on a printed card. The web or ribbon may carry lamination "chips" which are positioned precisely for laminating onto a printed card, and then removed from the web or ribbon when they are laminated in place.

Additionally, separate identification marks can be placed onto the ribbon for identifying particular panels or longitudinal positions of the ribbon. It is necessary to make the identification of the marks rapidly, and very precisely when the sensed object is used. It has been found that using standard reflective optical sensors can cause unwanted reflection of LED light on shiny surfaces that will make it hard to distinguish between a shiny printer ribbon surface, and a mark on such ribbon that is to be used for identification of a particular position.

SUMMARY OF THE INVENTION

The present invention relates to the use of a reflective type optical sensor for identifying individual marks that have been placed onto a shiny or reflective surface to identify particular locations on the surface. The positions or locations on a ribbon needing identification might be lines between different color sources of a thermal dye sublimation or a thermal transfer ribbon or web, may be the position of a block to be printed on an intermediate transfer ribbon. Additionally, marks can be used for identifying the position of lamination chips that are to be laminated onto previously printed identification cards and are carried on a web.

The LED that is used can be used without focusing lenses. Angling the axis of a light beam so that it is not perpendicular to the plane of the shiny ribbon surface has been found to increase the sensitivity of the sensor, and decrease incidents of the reflective, near mirror like surface, causing an output from the light sensitive sensor.

A number of sensor assemblies, each with a light source in the assembly can be used across the width of a printer ribbon, for sensing a number of different types of marks, but in each instance the sensor assembly is positioned so that the light source axis is at an angle relative to the plane of the ribbon other than perpendicular or near perpendicular and the light sensitive sensor is positioned along the ribbon in a location to minimize the amount of reflected light from shiny surfaces or mirror like surfaces of ribbon and yet provide a position signal from light that is reflected in a diffused manner from an identification mark. The identification mark can be a white mark or a light mark that may be off color white, including yellows. The diffusion of reflected light is needed, and white is a preferred color.

The sensor body is inclined at a selected angle so the light axis is preferably between 30 and 45° relative to the plane of the surface being sensed, such as the surface of a web or ribbon in a printer.

The light that is diffused by the white mark and reflected back to the sensor is from light beams that are not reflected directly back from a shiny surface. The shiny ribbon surface acts more like a mirror and reflects light at an angle of reflection that is substantially equal to the angle of incidence.

DETAILED DESCRIPTION OF THE ILLUSTRATIVE EMBODIMENTS

Figure 1:
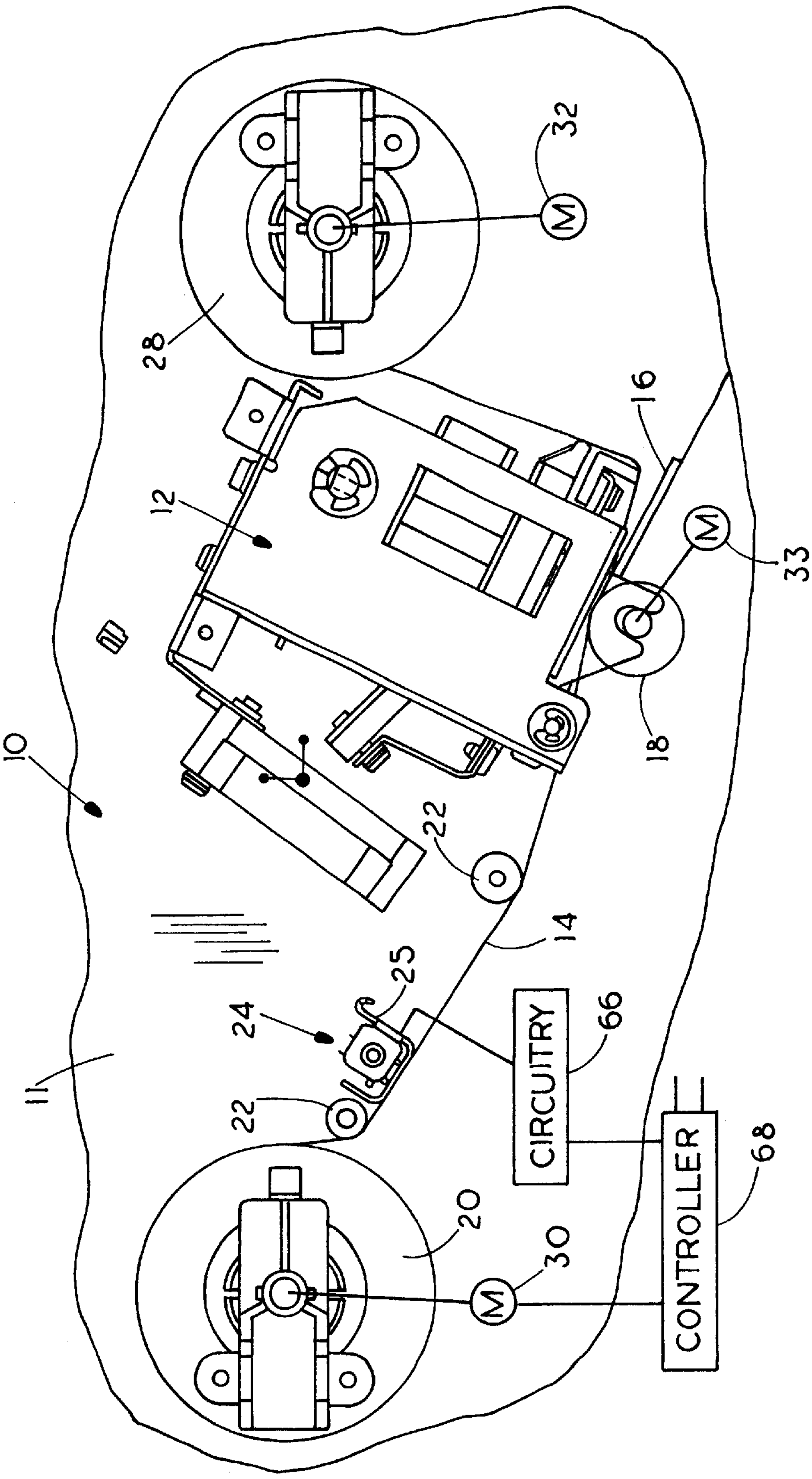
FIG. 1 is a schematic view of a typical printhead and print ribbon arrangement showing the sensor assemblies positioned according to the present invention in a typical printer installation.

A printer 10 is schematically shown and has a housing 11 that mounts a printhead 12 in a normal manner. The printhead 12 extends transversely across a ribbon 14, to print material from the ribbon onto a substrate or print material 16 that is held in place with a platen roller 18. The ribbon 14 is provided from a ribbon supply roll 20, and is guided over suitable guide rollers 22 past a sensor assembly 24 to the printhead 12, and then it is passed to a takeup roll 28. The supply roll 20 is driven in a suitable manner with a controllable DC motor 30, and the takeup roll 28 is driven with a DC motor 32 in a normal manner. The platen 18 shown is also driven with a controllable motor of suitable design, such as that shown at 33.

The sensor support assembly 24 includes a channel shaped bar 25 that is mounted in the printer housing 11, between side walls of the housing, and as shown, has a base wall 40 with the plurality of openings 42 in the base wall that are spaced apart a desired amount. The openings 42 will correspond to position of marks put onto the ribbon 14. The light reflecting and diffusing marks, preferably white marks, are shown typically at 44 as marks that separate and identify individual color panels 46 and 47 on the ribbon. The panels 46 and 47 are different colors and are separated by a space along which marks 44 are printed or otherwise applied. A dotted line 48 is shown as the start of panel 47 which may be magenta color, while panel 46 may be cyan. The center openings 42 in the base wall can be used for sensors to sense other conditions or ribbon properties.

The channel support bar 40 carries a plurality of individual sensor assemblies 50, which are each mounted in a housing 52. The sensor assemblies 50 are purchased parts made in one piece positioned to align with the openings 42, respectively. Each sensor assembly has a sensor housing 52 in which a light source 54, such as an LED, is mounted. A light sensitive sensor 58 is also mounted in the housing 52, but spaced from the LED. The sensor 58 is generally a light sensitive transistor, called a photo transistor. LED's are low cost light sources and the assembly does not include any lenses, so that the light from the LED will "cone" outwardly at an angle to the central axis 55 of the light. The light sensitive sensor or transistor 58 will receive light which has been reflected off objects passing close to the LED.

Figure 2:
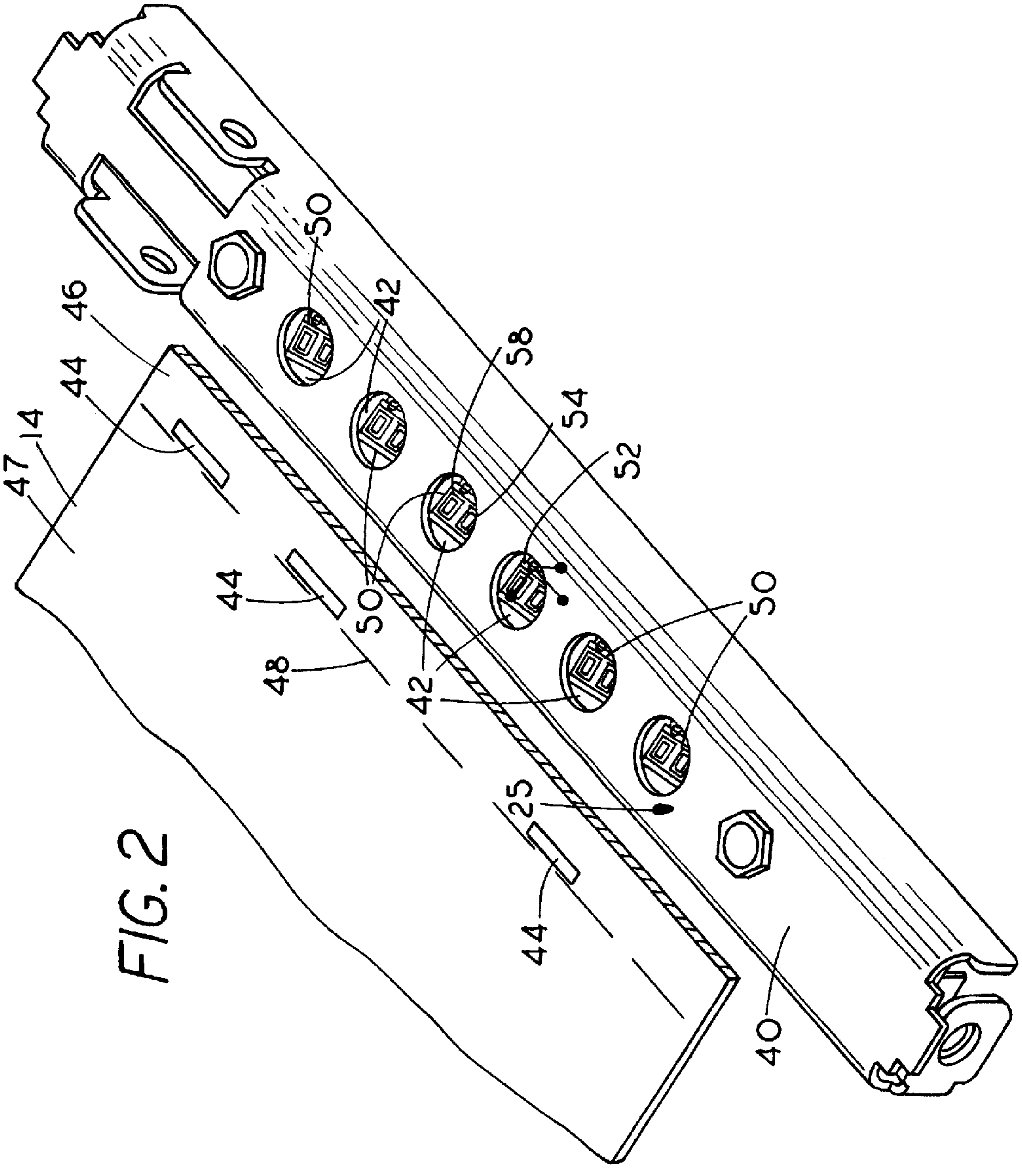
FIG. 2 is a perspective view of a sensor support bar that is mounted adjacent to a ribbon, the marks on which are to be sensed.
Figure 3:
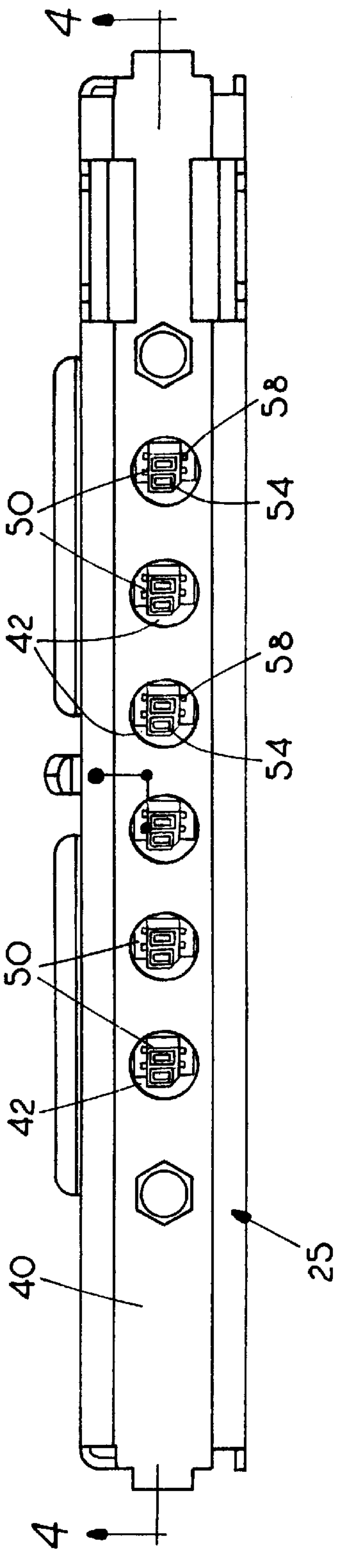
FIG. 3 is a bottom plan view of the sensor support bar or FIG. 2.
Figure 4:
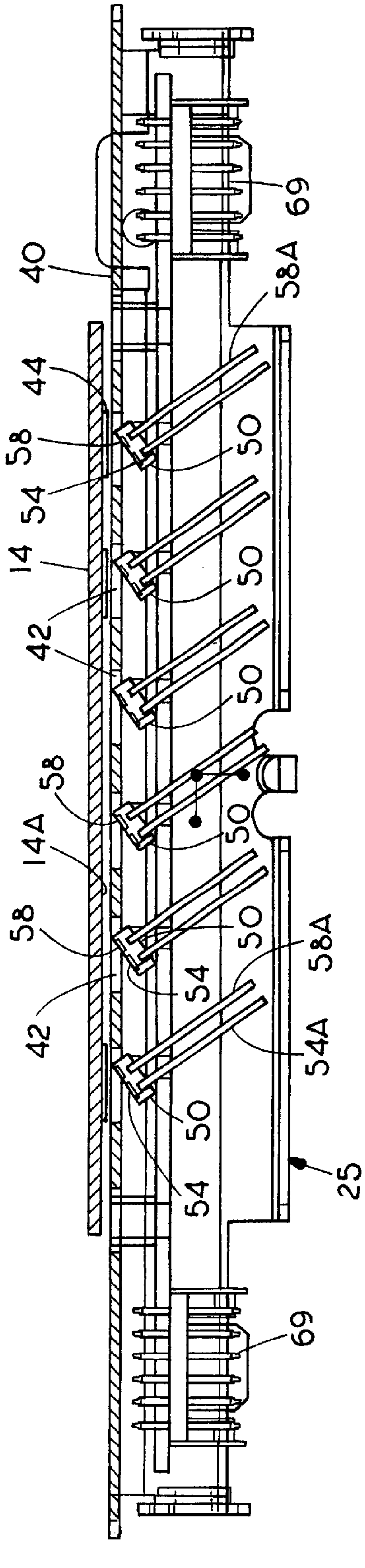
FIG. 4 is a sectional view taken as on line 4—4 in FIG. 3.
Figure 5:
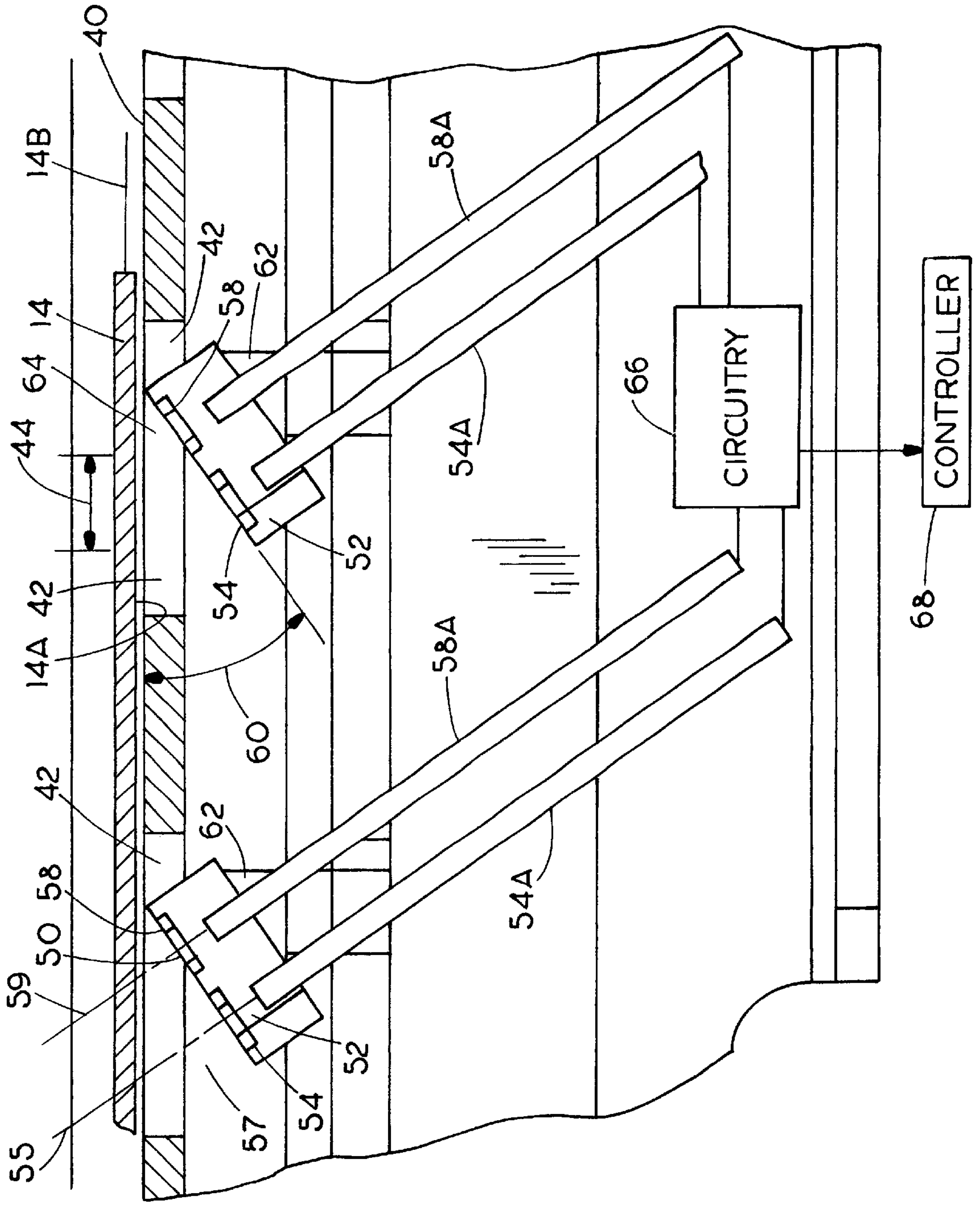
FIG. 5 is an enlarged view of sensors mounted on a sensor support bar as shown in FIG. 3.

The ribbon 14, as shown in FIG. 2 and in FIG. 4 passes closely over the outer surface of the base 40 of the channel member 25, and the ribbon can actually be in contact with the channel member, if desired. In any event the web or ribbon 14 is shown in exaggerated thickness in these views, but has an undersurface 14A that is quite shiny, and it has been found that if the sensor assemblies, which are low cost LED reflective sensors made by Sharp Electronics, Inc. are positioned so that the axis of the LED, which is illustrated in FIG. 5, at 55 is perpendicular to the surface of the ribbon 14, the light from the LED that is illustrated by the lines shown at 57 in FIG. 5 will cause reflection back onto the sensor 58, and it becomes difficult to discern identification marks, such as those shown at 44, which are light diffusing white marks.

In order to solve the problem of rapid identification of the information that is coded onto the ribbon under surface by the marks 44, the axis 55 of the LED, and thus the central axis 59 of the sensor 58 are inclined relative to the undersurface 14A of the ribbon at an acute angle, preferably between 30° and 45°. The most preferred angle is in the range of 40°, measured parallel to the plane of the ribbon 14 that is indicated at 14B in FIG. 5. The angle is indicated by double arrow 60 in FIG. 5.

As illustrated at 57, the light from the LED will disperse in a cone shape, and the light beam will become wider as the distance from the LED increases. It can be seen in FIG. 5, with the mounting angle, which is measured as indicated by the double arrow 60, the angle of reflection from the shiny undersurface 14A of the ribbon 14 will follow the normal reflection patterns where the angle of incidence equals the angle of reflection. With no light diffusing mark there will be little, if any, light reflected back onto the sensor 58 of the common housing 52 for that sensor assembly 50.

It can also be seen that the sensor housing 52 is positioned with a mounting bracket 62 as close to the plane of the base 40, or the outer surface of the base 40, as possible. A portion of the sensor assembly housing will project into the respective opening 42 for that sensor assembly. This positions the light sensitive sensor 58 close to the light diffusing mark as the mark passes over the respective opening. The inclination also could be reversed, so the light source was closer to the ribbon.

As shown in the sensor in the right hand in FIG. 5, when a mark 44 is over the LED for that sensor assembly 50, the light that is projected upwardly onto the mark 44 carried as the undersurface 14A of the ribbon 14 will diffuse, disperse and reflect, because of the white mark, or very light colored mark used. This will provide light along lines 64 back to the light sensitive sensor 58 of that sensor housing 52, and provide a signal along the signal line 58A. The LED is powered along a signal line 54A, from suitable power and sensing circuitry 66 of conventional design. The circuitry 66, and the stepper motors for the ribbon drive, and the printer are controlled by a controller 68 of conventional design that is used for controlling all the functions of the printers including receiving the signals from the circuitry 66 indicating that particular marks 44 are present in one or more of the openings 42. Connectors 69 are mounted on the bar 25 for connecting the components (FIG. 4).

The individual marks 44 can be used in connection with thermal print ribbons to identify the separation between individual color blocks or panels, as previously mentioned, and this can be done using only one of the openings 42, so that there are, as shown, five other openings and sensors available for obtaining other information. When intermediate transfer ribbons are used for example, where there is a printing onto a transfer ribbon which printing is subsequently transferred onto an identification card, the coding for the individual start and end of the sections to be printed can be placed at a suitable lateral location on the transfer ribbon and sensed by one of the sensor assemblies 50, projecting light through one or more aligning openings 42.

In many lamination techniques, as shown in U.S. Pat. No. 5,807,461 the lamination sections are formed by individual "chips" or lamination panels that will be placed over an identification card. A suitable light colored, preferably white, mark at the leading end of each of these lamination chips can be sensed by the sensor assembly of the present invention utilizing one of the openings 42 and the sensor assembly 50 associated with that opening.

A wide variety of conditions that take place can thus be sensed by using the angled orientation of the light source relative to a shiny, reflective surface, or other uniform color surface would reflect light back. When the axis of the light and the axis of the sensor are perpendicular to the plane of a reflecting shiny surface that is passing adjacent the light a false signal may be generated. By inclining the light source and sensor, and then using a light diffusing, or dispersing color for the identification marks, the presence of the mark can be determined with accuracy, and with relative speed. The marks can be sensed with approximately a two millimeter width at normal ribbon speeds, so that the sensors are quite fast in response time, and if desired the marks can be made wider in the longitudinal direction or in the direction of movement of the ribbon.

The example discussed is where the LED is in the infrared range. When light sources are of a different frequency or color, a different color mark may diffuse or disperse light so that the present sensor arrangement will work if the marks are a darker color. A mark that is "frosted" in place, or which is a matte finish on the ribbon, which contrasts with the shiny surface of the rest of the ribbon also will work. Thus, the marks do not have to be white, but do need to disperse light sufficiently for the light sensor to provide an output.

Although the present invention has been described with reference to preferred embodiments, workers skilled in the art will recognize that changes may be made in form and detail without departing from the spirit and scope of the invention.

What is claimed is:

1. A reflective light sensor for sensing presence of marks on a surface comprising a light source having a light axis, a light sensitive sensor mounted adjacent to the light source, the light source having a central axis being mounted relative to the surface with the light axis at an acute angle sufficient to reduce reflections onto the sensor from the surface until a portion of the surface having a different light reflective characteristic receives light from the light source, the different light characteristics being sensed by the light sensitive sensor, said sensor comprises a unitary housing mounting said light source and said light sensitive sensor, and said light source and said light sensitive sensor having parallel axis.

2. The sensor of claim 1 wherein said surface comprises a web in a printer.

3. The sensor of claim 2 wherein the web is one of a group consisting of a thermal print ribbon and an intermediate transfer ribbon.

4. The sensor of claim 1, wherein the light sensitive sensor is positioned more closely adjacent the surface than the light source.

5. The apparatus of claim 1 wherein said surface is shiny and the light source is infrared and said portion of the surface is a white mark.

6. The sensor of claim 1, wherein the acute angle is in the range of between thirty and forty-five degrees relative to the surface.

7. A printer assembly including a printhead, a ribbon having a reflective surface, a series of identification marks spaced along the ribbon for identifying characteristics of segments of the ribbon, the marks being selected to be light reflecting, a sensor for sensing the marks comprising a light source providing a beam of light along a central axis, a receiver for receiving reflected light adjacent the light source and providing a signal when reflected light strikes the receiver, the light source axis being at an acute angle relative to the surface of the ribbon and the receiver having a central receiving axis parallel to the axis of the beam of light.

8. The printer assembly of claim 7, wherein the marks are white.

9. The printer assembly of claim 7, wherein the light source and receiver are mounted in a common housing.

10. The printer assembly of claim 7, wherein the series of identification marks are spaced in lateral direction across the ribbon and the ribbon moves in a longitudinal path perpendicular to the lateral direction, and a support bar extending in lateral direction to the ribbon for supporting a plurality of sensors at lateral locations corresponding to the longitudinal path of movement of the identification marks, the support bar having a plurality of openings therein aligned with the plurality of sensors for permitting the beam of light to pass through the openings and shine on an under surface of the ribbon, such that a plurality of the spaced marks are usable to identify each individual segment of the ribbon trailing the mark as the ribbon moves in its longitudinal path it passes over the support bar.

11. The printer assembly of claim 10, wherein the light source axis is at a acute angle of between thirty and forty-five degrees relative to the surface of the ribbon, and the receiver has an axis that is inclined at substantially the same acute angle as the light source axis.

* * * * *